United States Patent
Liu et al.

(10) Patent No.: US 12,116,437 B1
(45) Date of Patent: Oct. 15, 2024

(54) ASPHALTENE DISPERSION STABILIZER AND PREPARATION METHOD THEREFOR

(71) Applicant: Southwest Petroleum University, Chengdu (CN)

(72) Inventors: Pingli Liu, Chengdu (CN); Chengjie Wang, Chengdu (CN); Jinzhou Zhao, Chengdu (CN); Juan Du, Chengdu (CN); Xiang Chen, Chengdu (CN); Xianyu Song, Chengdu (CN); Guan Wang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/590,881

(22) Filed: Feb. 28, 2024

(30) Foreign Application Priority Data

Nov. 24, 2023 (CN) .......................... 202311582311.9

(51) Int. Cl.
*C08F 220/38* (2006.01)
*C10G 75/04* (2006.01)

(52) U.S. Cl.
CPC .......... *C08F 220/387* (2020.02); *C10G 75/04* (2013.01); *C10G 2300/4075* (2013.01)

(58) Field of Classification Search
CPC ........................... C08F 220/387; C10G 75/04
See application file for complete search history.

*Primary Examiner* — Catherine S Branch
(74) *Attorney, Agent, or Firm* — Birchwood IP

(57) ABSTRACT

The present invention provides an asphaltene dispersion stabilizer and a preparation method therefor, and relates to the technical field of oilfield additives. The asphaltene dispersion stabilizer is prepared by the following method: taking iminodisuccinic acid or salt thereof, and performing Michael addition reaction on the iminodisuccinic acid or the salt thereof and unsaturated sulfonate to prepare a first intermediate; taking the first intermediate, and performing amidation reaction on the first intermediate and a first monomer under the action of a catalyst to obtain a second intermediate; and preparing a dendrimer by taking the second intermediate as a core and taking a second monomer and a third monomer as raw materials, wherein the dendrimer is the asphaltene dispersion stabilizer, and the generation number of the dendrimer is 0.5 generations, 1.5 generations or 2.5 generations. The asphaltene dispersion stabilizer of the present invention has a good dispersion stabilization effect on asphaltene.

8 Claims, No Drawings

ASPHALTENE DISPERSION STABILIZER AND PREPARATION METHOD THEREFOR

CROSS-REFERENCE TO RELATED APPLICATIONS

This application claims priority to Chinese Patent Application No. 202311582311.9, filed on Nov. 24, 2023, which is hereby incorporated by reference in its entirety.

TECHNICAL FIELD

The present invention belongs to the technical field of oilfield additives, and specifically relates to an asphaltene dispersion stabilizer and a preparation method therefor.

BACKGROUND

Thickened oil contains a large amount of asphaltene. In the development, transportation and post-treatment processes of the thickened oil, due to the change in the environment of the thickened oil, the stabilization effect of colloid in the thickened oil on the asphaltene is broken, causing asphaltenes to settle. After the asphaltene settles, the blockage in a reservoir, a shaft, production equipment, a pipeline and the like can be caused. Therefore, an asphaltene dispersion stabilizer is often used in the process of developing and transporting thickened oil.

The asphaltene dispersion stabilizer currently used usually includes a water-based asphaltene dispersion stabilizer and an oil-based asphaltene dispersion stabilizer. The oil-based asphaltene dispersion stabilizer contains more solvent oil, has a high price and is easy to cause pollution to stratum. Most of the water-based asphaltene dispersion stabilizers contain some surfactants. Although the surfactants have a certain effect on the dispersion stability of asphaltene, the addition of the surfactants can aggravate emulsification of the thickened oil; and the heavy oil contains a large amount of heavy hydrocarbons, colloids and asphaltenes, consequently, the demulsification effect in the subsequent process is very unsatisfactory. Meanwhile, the temperature resistance of the surfactant is poor, usually tens of degrees Celsius, which makes the surfactant difficult to apply in a high-temperature environment.

SUMMARY

To solve at least one of the above problems, the present invention provides an asphaltene dispersion stabilizer having good dispersion stability for asphaltenes and capable of being applied in a high-temperature environment.

A technical solution of the present invention is as follows: a preparation method for an asphaltene dispersion stabilizer comprises the following steps:
  taking iminodisuccinic acid or salt thereof, and performing Michael addition reaction on the iminodisuccinic acid or the salt thereof and unsaturated sulfonate to prepare a first intermediate;
  taking the first intermediate, and performing amidation reaction on the first intermediate and a first monomer under the action of a catalyst to obtain a second intermediate; and
  preparing a dendrimer by taking the second intermediate as a core and taking a second monomer and a third monomer as raw materials, wherein the dendrimer is the asphaltene dispersion stabilizer; the generation number of the dendrimer is 0.5 generations, 1.5 generations or 2.5 generations;
  a molar ratio of the iminodisuccinic acid or the salt thereof to the unsaturated sulfonate is 1:1-1.2; in the process of preparing 0.5 generation of dendrimer, a molar ratio of the iminodisuccinic acid or the salt thereof to the first monomer is 1:3.8-4.5; the first monomer and the third monomer are independently one of linear aliphatic diamines, and the second monomer is one of methacrylate and methyl methacrylate.

In one embodiment of the present invention, the unsaturated sulfonate is one of allyl sulfonate and p-styrene sulfonate.

In one embodiment of the present invention, the linear aliphatic diamine is one of ethylenediamine, propanediamine, butanediamine, pentanediamine and hexamethylenediamine.

In one embodiment of the present invention, a molar ratio of the first intermediate to the first monomer is 1:4-4.5.

In one embodiment of the present invention, the specific preparation method for the first intermediate comprises the following steps: dissolving iminodisuccinic acid and unsaturated sulfonate in a first solvent separately, adding base into a solution of the iminodisuccinic acid or the salt thereof, heating to 20-50° C., reacting for 12-24 h, and removing the first solvent after the reaction is completed to obtain the first intermediate.

In one embodiment of the present invention, the specific preparation method for the dendrimer comprises the following steps: dissolving the second intermediate in a first solvent, adding base, heating to 20-50° C., adding the second monomer, and reacting for 12-24 h to prepare 0.5 generation of dendrimer; adding a third monomer, and reacting for 12-24 h to prepare 1.0 generation of dendrimer after the reaction is completed; and repeating the above procedures until 1.5 generation or 2.5 generation of dendrimer is obtained.

Further, the base is one of an organic base or an inorganic base, and the first solvent is methanol, ethanol or water and a mixture thereof.

In one embodiment of the present invention, the specific preparation method for the second intermediate comprises the following steps: taking the first intermediate, adding a second solvent for dissolving, then adding a catalyst and a first monomer, heating to 20-50° C., reacting for 2-8 h, and removing the second solvent after the reaction is completed.

Further, the catalyst is one of dicyclohexylcarbodiimide and 1-ethyl-(3-dimethylaminopropyl)carbodiimide, and the second solvent is one of dimethyl sulfoxide and dimethylformamide.

Another objective of the present invention is to provide an asphaltene dispersion stabilizer prepared by any one of the methods.

The beneficial effects of the present invention are as follows.

The asphaltene dispersion stabilizer of the present invention modifies iminodisuccinic acid or salt thereof by grafting a sulfonic acid group and a diamine compound, takes the modified product as the core of a dendrimer, and then prepares the dendrimer by using a conventional method. The dendrimer comprises a nonionic carboxylate group and an anionic sulfonic acid group, and the two groups have a certain dispersing effect; the dendrimer has a tree-like structure as a whole, so that the structure of the asphaltene can be damaged, the structure of the asphaltene becomes loose, and the asphaltene can be well dispersed and stabilized; and meanwhile, the sulfonic acid group can also increase the temperature resistance of the dendrimer, allowing the dendrimer to resist a temperature of 150° C.

DESCRIPTION OF EMBODIMENTS

To make the technical solutions and technical advantages of the present invention clearer, the technical solutions in the implementation of the present invention will be clearly and completely described below in conjunction with the examples.

In the present invention, the unsaturated sulfonate refers to a sulfonate containing one ethylenic bond, and may be potassium salt, sodium salt or the like.

In the present invention, the amidation reaction refers to a reaction in which one hydrogen atom of an amino group is replaced with a carbonyl group.

In the present invention, the core of polyamidoamine dendrimer refers to an initiator of the polyamidoamine dendrimer. For example, when ethylenediamine and methyl acrylate are used to prepare polyamidoamine dendrimer, ethylenediamine is the core of the dendrimer.

A preparation method for an asphaltene dispersion stabilizer comprises the following steps:

taking iminodisuccinic acid or salt thereof, and performing Michael addition reaction on the iminodisuccinic acid or the salt thereof and unsaturated sulfonate to prepare a first intermediate;

taking the first intermediate, and performing amidation reaction on the first intermediate and a first monomer under the action of a catalyst to obtain a second intermediate; and preparing a dendrimer by taking the second intermediate as a core and taking a second monomer and a third monomer as raw materials, wherein the dendrimer is the asphaltene dispersion stabilizer; the generation number of the dendrimer is 0.5 generations, 1.5 generations or 2.5 generations;

a molar ratio of the iminodisuccinic acid or the salt thereof to the unsaturated sulfonate is 1:1-1.2; in the process of preparing 0.5 generation of dendrimer, a molar ratio of the iminodisuccinic acid or the salt thereof to the first monomer is 1:3.8-4.5; the first monomer and the third monomer are independently one of linear aliphatic diamines, and the second monomer is one of methacrylate and methyl methacrylate.

Specifically, the reason why the iminodisuccinic acid or the salt thereof is used as the core of the preparation of the second intermediate in the present invention is that the iminodisuccinic acid or the salt thereof has 4 carboxyl groups and a secondary amine group, has high reactivity and can react with some substances for modification.

In the present invention, the first intermediate is prepared for inserting a sulfonic acid group as a group of an anionic dispersant into a dendrimer, and the inventors have found that the dispersing effect of an asphaltene dispersant can be effectively increased when the sulfonic acid group is applied to the dispersant. Meanwhile, the sulfonic acid group also enables the whole dendrimer to have better temperature resistance. To enable the secondary amine group in the iminodisuccinic acid or the salt thereof to be grafted with a sulfonic acid group rapidly, in the present invention, the unsaturated sulfonate is used as a modifying material. The unsaturated sulfonate refers to sulfonate containing one ethylenic bond, such as vinyl sulfonate, allyl sulfonate, p-styrene sulfonate and m-styrene sulfonate; however, from the perspective of actual effects, allyl sulfonate and p-styrene sulfonate are preferred, and p-styrene sulfonate is more preferred.

To enable the first intermediate to serve as the core of the polyamidoamine dendrimer, the first intermediate needs to be further modified. Typically, the polyamidoamine core is a diamine having two primary amine groups at each end of the chain which are capable of reacting with 4 methacrylates. In the present invention, the first intermediate and the linear aliphatic diamine are further subjected to amidation reaction to prepare a second intermediate, and during the reaction, the carboxyl of the first intermediate and the primary amine in the linear aliphatic diamine are subjected to amidation reaction, and finally the second intermediate is prepared through reaction, so that the second intermediate not only contains sulfonic acid groups, but also contains 4 primary amine groups, and the 4 primary amine groups can support the subsequent polyamidoamine reaction to generate the dendrimer. Meanwhile, the above dendrimer is different from the conventional dendrimer in that the core of the conventional dendrimer generally only has two primary amine groups, so that the branched structure is more, and the performance is better. In the process of preparing the second intermediate, the molar ratio of the first intermediate to the first monomer is 1:4-4.5.

After the core of the polyamidoamine dendrimer is prepared, the preparation of the dendrimer by using the core belongs to the conventional means in the art, and the preparation can be performed by those skilled in the art based on an actual situation. In the polyamidoamine dendrimer, the common raw materials are linear aliphatic diamines and methyl methacrylate, and in the present invention, the dendrimer can be prepared using these raw materials as well. The linear aliphatic diamine is one of ethylenediamine, propanediamine, butanediamine, pentanediamine and hexamethylenediamine. Meanwhile, the first monomer and the third monomer can be selected from linear aliphatic diamines. However, the first monomer and the third monomer can be independently selected from different or the same linear aliphatic diamines, for example, the first monomer can be propanediamine, and the third monomer can be butanediamine.

In the present invention, after carboxyl and linear aliphatic diamine are reacted, a plurality of primary amine groups are grafted on a terminus of the second intermediate, and these primary amine groups can be used as the starting points of subsequent reactions; meanwhile, in the process of grafting the linear aliphatic diamine, the amino group reacts with the carboxyl group to generate an amide group, and the amide group also belongs to a polar group, so that the adsorption capacity of the dispersion stabilizer and the asphaltene of the present invention can be improved, and the dispersion stabilizer and the asphaltene have better dispersion effects.

It is common knowledge in the art to perform Michael addition reaction of secondary amines and olefinic bonds. Those skilled in the art can select appropriate preparation conditions based on an actual situation, however, to facilitate those skilled in the art to further understand the technical solution of the present invention, the present invention still provides a preparation method for a first intermediate, which comprises the following steps: dissolving iminodisuccinic acid and unsaturated sulfonate in a first solvent separately, adding base into a solution of the iminodisuccinic acid or the salt thereof, heating to 20-50° C., reacting for 12-24 h, and removing the first solvent after the reaction is completed to obtain the first intermediate. In this process, the added base is used as a catalyst, so the addition amount of the base is the catalyst equivalent, for example, 0.5%-2% of the total mass of the iminodisuccinic acid and the unsaturated sulfonate, and can be increased properly, such as 10%. The base added can be an organic base or an inorganic base, wherein the organic base usually includes tertiary amines including triethylamine, and the inorganic base usually includes sodium carbonate, sodium hydroxide and the like. The primary function of the first solvent is to dissolve iminodisuccinic acid and provide a reaction site for iminodisuccinic acid and the unsaturated sulfonate, therefore, a solvent capable of dissolving two reaction materials can be selected. From the perspective of cost, the inventors can select methanol, ethanol or water and a mixture thereof as the first solvent, and those skilled in the art can select the remaining solvent as the first solvent based on an actual situation, wherein the mixture refers to mixing methanol (ethanol) and water in a certain proportion, such as mixing methanol and water in 4:1 as the first solvent. Meanwhile, the reaction time is not limited to 24 hours, and the reaction can be continued without considering the economic efficiency, but in practice, the yield does not increase or increases only a little when the reaction time reaches 24 hours, and therefore, an upper limit of the reaction time is 24 hours from the perspective of cost the cost. Meanwhile, for the reaction temperature, the higher the temperature is, the shorter the reaction time is, and vice versa; however, when the temperature exceeds 50° C., the reaction is too violent, so that the upper limit of the temperature is defined as 50° C.

Similarly, the amidation reaction of a carboxyl group and primary amine is a conventional reaction, and those skilled in the art can select suitable preparation conditions base on an actual situation, however, to facilitate those skilled in the art to further understand the technical solution of the present invention, the present invention still provides a preparation method for a second intermediate, which comprises the following steps: taking the first intermediate, adding a second solvent for dissolving, then adding a catalyst and a first monomer, heating to 20-50° C., reacting for 2-8 h, and removing the second solvent after the reaction is completed. In this process, the second solvent may be selected from one of dimethylsulfoxide, dimethylformamide or the remaining solvent in the art that can dissolve the first intermediate and the first monomer at the same time and does not react with any substance in this step. The catalyst is a catalyst commonly used in amidation reaction, such as dicyclohexylcarbodiimide and 1-ethyl-(3-dimethylaminopropyl)carbodiimide, which can be applied to the present invention; and the addition amount of the catalyst is the same as that of the conventional catalyst, for example, the addition amount is 0.1-1.0% of the total mass of all monomers.

Similarly, the preparation of polyamidoamine dendrimer belongs to a common means in the art, and the present invention can also use a common means in the art to prepare a dendrimer, however, to facilitate those skilled in the art to further understand the technical solution of the present invention, the present invention still provides a preparation method for the dendrimer, which comprises the following steps: dissolving the second intermediate in a first solvent, adding base, heating to 20-50° C., adding the second monomer, and reacting for 5-24 h to prepare 0.5 generation of dendrimer; adding a third monomer, and reacting for 12-24 h to prepare 1.0 generation of dendrimer after the reaction is completed; and repeating the above procedures until 1.5 generation or 2.5 generation of dendrimer is obtained. When different generations of dendrimers are needed, the dendrimers are prepared based on corresponding steps. As in conventional methods in the art, in the preparation of 1.0 generation of dendrimer, a molar weight of the third monomer is the same as that of the second monomer added during the preparation of 0.5 generation of dendrimer; in the preparation of 2.0 generation of dendrimer, a molar weight of the third monomer is the same as that of the second monomer added in the preparation of 1.5 generation of dendrimer; and for the second monomer, the addition amount will approximately double when the generation number increases by 1 generation. For example, if 1 mol of iminodisuccinic acid is added during the preparation, a molar weight of the first monomer is 4.1 mol when the second intermediate is prepared; when 0.5 generation of dendrimer is prepared, the addition amount of the second monomer is 8.1 mol, when 1.0 generation of dendrimer is prepared, the addition amount of the third monomer is 8.1 mol, and when 1.5 generation of dendrimer is prepared, the addition amount of the second monomer is 16.1 mol, and the addition amount of the third monomer is 16.1 mol. The steps are repeated until the required generation of the dendrimer is prepared.

The asphaltene dispersion stabilizer prepared by the method of the present invention is a solid phase, and before specific use, a certain amount of solvent can be added for dispersion, such as corresponding toluene, ethanol and methanol; and a mass ratio of the asphaltene dispersion stabilizer to the solvent can be 1:1-3.

Unless otherwise stated, the methods used in the following examples are conventional methods.

The materials, reagents and the like used in the following examples can be commercially available unless otherwise stated.

Example 1

Preparation of a first intermediate: dissolving 24.9 g of iminodisuccinic acid in ethanol, dissolving 22 g of sodium p-styrenesulfonate in ethanol, adding 0.5 g of triethylamine to the iminodisuccinic acid solution, uniformly stirring, heating to 45° C., dropwise adding the sodium p-styrenesulfonate solution to the iminodisuccinic acid solution, continuously reacting for 15 h, and after the reaction is completed, distilling under reduced pressure to remove the solvent to obtain the first intermediate.

Preparation of a second intermediate: dissolving the first intermediate prepared in the above step in dimethylformamide, dissolving 47.5 g of hexamethylenediamine in dimethylformamide, adding 0.36 g of dicyclohexylcarbodiimide and the hexamethylenediamine solution into the first intermediate solution, heating to 40° C., continuously reacting for 5 h, and after the reaction is completed, distilling under reduced pressure to remove the dimethylformamide to obtain the second intermediate.

Preparation of an asphaltene dispersion stabilizer: dissolving the second intermediate in ethanol, adding 1.0 g of triethylamine, uniformly stirring, dropwise adding 81 g of methyl methacrylate, heating to 35° C. for reacting for 18 h, dropwise adding 60 g of 1,3-diaminopropane after the reaction is completed, continuing to react for 18 h, dropwise adding 162 g of methyl methacrylate after the reaction is completed, reacting for 20 h, distilling under reduced pressure to remove the solvent after the reaction is completed, and repeating the operations to finally obtain the asphaltene dispersion stabilizer with the generation number of 1.5.

Example 2

This example is different from Example 1 in that 22 g of sodium p-styrenesulfonate is replaced with 15.0 g of sodium allylsulfonate in the preparation of the first intermediate, and the rest are the same.

Example 3

This example is different from Example 1 in that the generation number of the asphaltene dispersion stabilizer in the production process is 0.5 generations, and the rest are the same.

Example 4

This example is different from Example 1 in that the generation number of the asphaltene dispersion stabilizer in the production process is 2.5 generations, and the rest are the same.

Comparative Example 1

This comparative example is different from Example 1 in that the iminodisuccinic acid and hexamethylenediamine are directly used to react to prepare the second intermediate, and the rest are the same.

Comparative Example 2

This example is different from Example 1 in that the generation number of the asphaltene dispersion stabilizer in the production process is 3.5 generations, and the rest are the same.

To further explain the effects of the asphaltene dispersion stabilizer prepared in the above examples, the asphaltene dispersion stabilizer prepared above is tested as follows.

1. Dispersion Stability Test

The asphaltene dispersion stabilizers prepared in the above examples and comparative examples were dispersed with toluene at a mass ratio of 1:2 before use.

The thickened oil from Shengli Oilfield with an asphaltene content of 15.3% and a density of 0.9617 g/cm3 was taken. The dispersion stability of the asphaltene dispersion stabilizer was measured by the following method. Control group: taking 2 g of thickened oil sample, adding 30 mL of n-heptane, keeping stand for 24 h under different temperature conditions, then centrifuging the thickened oil sample, and measuring a mass of a solid phase to be m1. Experimental group: taking 2 g of thickened oil sample, adding 30 mL of n-heptane and adding a dispersion stabilizer (solid) with a mass concentration of 800 ppm, stirring uniformly, keeping stand for 24 h under different temperature conditions, then centrifuging the thickened oil sample, and measuring a mass of a solid phase to be m2. The calculation formula for the dispersion stability of the asphaltene dispersion stabilizer is as follows: m1-m2/m1. The final experimental results are shown in Table 1.

TABLE 1

Dispersion stability test results under different temperature conditions

| Asphaltene dispersion stabilizer | Dispersion stability % | |
|---|---|---|
| | 30° C. | 150° C. |
| Example 1 | 95.8 | 95.1 |
| Example 2 | 85.6 | 83.5 |
| Example 3 | 92.4 | 92.0 |
| Example 4 | 90.8 | 90.6 |
| Comparative Example 1 | 68.4 | 52.9 |
| Comparative Example 2 | 70.2 | 69.7 |

It can be seen from Table 1 that the asphaltene dispersion stabilizer prepared in the examples of the present invention has a good dispersion stabilization effect and high temperature resistance and can resist a high temperature of 150° C.

2. Initial Precipitation Point Test

Based on the characteristic that asphaltene is soluble in toluene but insoluble in n-heptane, the initial precipitation point is usually used to judge the performance of the asphaltene dispersion stabilizer. The specific test method for the initial precipitation point is shown below. Control group: dissolving 10 g of thickened oil in 10 g of toluene, then titrating with n-heptane, dipping 1 drop of thickened oil on a filter paper by a glass rod during titration, observing the diffusion process of the drop, wherein when a circle of black spots appear at a diffusion center, it indicates that asphaltene has precipitated, and recording the dropping amount V1 of the n-heptane. Experimental group: dissolving 10 g of thickened oil in 10 g of toluene, adding a dispersion stabilizer (solid) with a mass concentration of 800 ppm, uniformly stirring, then titrating with n-heptane, dipping 1 drop of thickened oil on a filter paper by a glass rod during titration, observing the diffusion process of the drop, wherein when a circle of black spots appear at a diffusion center, it indicates that asphaltene has precipitated, and recording the dropping amount V2 of the n-heptane. The final improvement rate Y of the initial precipitation point is: Y=(V2−V1)/V2. The final experimental results are shown in Table 2.

TABLE 2

Initial precipitation point test results

| Sample | Example 1 | Example 2 | Example 3 | Example 4 | Comparative Example 1 | Comparative Example 2 |
|---|---|---|---|---|---|---|
| Y/% | 38.5 | 29.2 | 34.2 | 31.9 | 22.1 | 15.3 |

It can be seen from Table 2 that the asphaltene dispersion stabilizer prepared in the examples of the present invention can effectively disperse and stabilize asphaltenes, thereby reducing the initial precipitation point.

The above descriptions are only preferred examples of the present invention, and are not intended to limit the present invention in any form. Although the preferred examples above have disclosed the present invention, they are not intended to limit the present invention. Any of those familiar with the technical field, without departing from the scope of the technical solutions of the present invention, can use the technical content disclosed above to make various changes and modify the technical content as equivalent changes of the equivalent examples. However, any simple modifications, equivalent changes and modifications made to the above examples according to the technical spirit of the present invention without departing from the content of the technical solutions of the present invention shall fall within the scope of the technical solutions of the present invention.

What is claimed is:

1. A preparation method for an asphaltene dispersion stabilizer, comprising the following steps:
   taking iminodisuccinic acid or salt thereof, and performing Michael addition reaction on the iminodisuccinic acid or the salt thereof and unsaturated sulfonate to prepare a first intermediate;
   taking the first intermediate, and performing amidation reaction on the first intermediate and a first monomer under the action of a catalyst to obtain a second intermediate; and
   preparing a dendrimer by taking the second intermediate as a core and taking a second monomer and a third monomer as raw materials, wherein the dendrimer is the asphaltene dispersion stabilizer; the generation number of the dendrimer is 0.5 generations, 1.5 generations or 2.5 generations;
   a molar ratio of the iminodisuccinic acid or the salt thereof to the unsaturated sulfonate is 1:1-1.2; in a process of preparing 0.5 generation of dendrimer, a molar ratio of the iminodisuccinic acid or the salt thereof to the first monomer is 1:3.8-4.5; the first monomer and the third monomer are independently one of linear aliphatic diamines, the second monomer is methacrylate or methyl methacrylate, and the linear aliphatic diamine is one of ethylenediamine, propanediamine, butanediamine, pentanediamine and hexamethylenediamine.

2. The method according to claim 1, wherein the unsaturated sulfonate is allyl sulfonate or p-styrene sulfonate.

3. The method according to claim 1, wherein the specific preparation method for the first intermediate comprises the following steps: dissolving the iminodisuccinic acid or salt thereof and the unsaturated sulfonate in a first solvent, performing Michael addition reaction on the iminodisuccinic acid or salt thereof and the unsaturated sulfonate in the first solvent, adding base as a catalyst into a solution of the iminodisuccinic acid or the salt thereof and the unsaturated sulfonate, heating to 20-50° C., reacting for 12-24 h, and removing the first solvent after the reaction is completed to obtain the first intermediate.

4. The method according to claim 1, wherein the specific preparation method for the dendrimer comprises the following steps: dissolving the second intermediate in a first solvent, adding base, heating to 20-50° C., adding the second monomer, and reacting for 12-24 h to prepare 0.5 generation of dendrimer; adding a third monomer, and reacting for 12-24 h to prepare 1.0 generation of dendrimer after the reaction is completed; and repeating the above procedures until 1.5 generation or 2.5 generation of dendrimer is obtained.

5. The method according to claim 3, wherein the base is an organic base or an inorganic base, and the first solvent is one of methanol, ethanol, water, a mixture of methanol and water, and a mixture of ethanol and water.

6. The method according to claim 1, wherein the specific preparation method for the second intermediate comprises the following steps: taking the first intermediate, adding a second solvent for dissolving, then adding a catalyst and a first monomer, heating to 20-50° C., reacting for 2-8 h, and removing the second solvent after the reaction is completed.

7. The method according to claim 6, wherein the catalyst is dicyclohexylcarbodiimide or 1-ethyl-(3-dimethylaminopropyl)carbodiimide, and the second solvent is dimethyl sulfoxide or dimethylformamide.

8. An asphaltene dispersion stabilizer prepared by the method according to claim 1.

* * * * *